Nov. 26, 1929.  A. S. HUGHES ET AL  1,736,787
BODY MOUNTING FOR TRACTORS
Filed Nov. 18, 1927
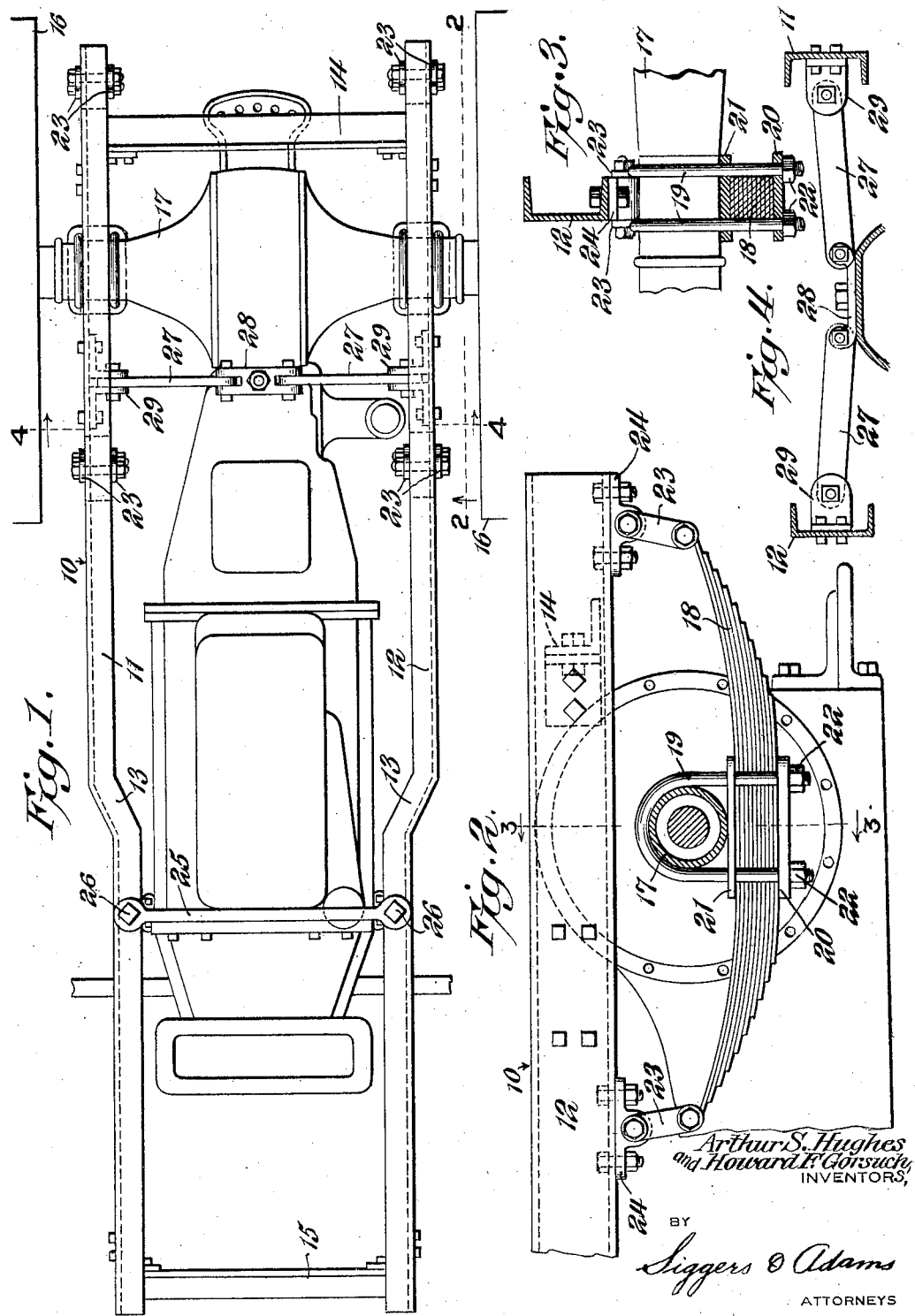
Arthur S. Hughes
and Howard P. Gorsuch
INVENTORS
BY
Siggers & Adams
ATTORNEYS Patented Nov. 26, 1929

1,736,787

UNITED STATES PATENT OFFICE

ARTHUR S. HUGHES AND HOWARD F. GORSUCH, OF MANSFIELD, OHIO, ASSIGNORS TO THE HUGHES-KEENAN COMPANY, OF MANSFIELD, OHIO, A CORPORATION OF OHIO

BODY MOUNTING FOR TRACTORS

Application filed November 18, 1927. Serial No. 234,215.

This invention relates to motor vehicles and aims to provide improved means for mounting a load carrying body on a standard tractor.

The nature of the invention may be readily understood by reference to one illustrative construction embodying the invention and shown in the accompanying drawing.

In said drawing:—

Fig. 1 is a plan view of the vehicle chassis (the load carrying body having been omitted to simplify illustration);

Fig. 2 is a fragmentary longitudinal section (somewhat enlarged) taken on the line 2—2 of Fig. 1;

Fig. 3 is a fragmentary vertical section taken on the line 3—3 of Fig. 2; and

Fig. 4 is a transverse section taken on the line 4—4 of Fig. 1.

The illustrative vehicle is herein represented by a standard Fordson tractor (of well known construction) on which is mounted a body supporting frame 10. In the present instance, the frame comprises a pair of channel members 11 and 12 extending longitudinally of the tractor on opposite sides of the tractor body between the body and the wheels. Adjacent the steering wheels of the tractor the channel members are offset inwardly as at 13 to allow greater steering clearance. The channel members are connected together adjacent their ends by transverse angle bars 14 and 15 which are appropriately bolted to the webs of the channel members, thus providing a unitary frame structure for supporting the body.

The load carrying body in this instance is intended to be supported adjacent the driving wheels 16 of the tractor, thereby imposing the greater proportion of the load on the driving axle structure. This axle structure 17 is advantageously protected from the load impacts of the load carrying body by cushioning means represented by leaf springs 18 connecting the frame 10 and the axle structure. In the present case, the middle portion of the spring is connected to the axle structure by means of U-shaped yoke bolts 19 embracing the axle housing and depending therefrom, their respective extremities passing on opposite sides of the respective springs and through plates 20 and 21 between which the spring is clamped by the nuts 22. The extremities of the respective springs are connected by hinged links 24 to depending brackets 23 bolted to the lower flanges of the respective channels 11 and 12. The link connection at each end of the springs allows full freedom for the action of the springs in cushioning the load shocks without requiring any shifting of the body supporting frame relative to the tractor itself.

The cushioned support of the load carrying body on the tractor protects the tractor from destructive load impacts which would otherwise be directly imposed on the tractor and materially shorten the life of the tractor.

The opposite end of the frame 10 is supported on the tractor body by means represented by the saddle 25 embracing the tractor body and bolted at 26 to the respective side members of the frame. The details of this supporting structure are not pertinent in this connection, but they are fully disclosed in our co-pending application, Serial No. 232,387. It is sufficient to note that the supporting means 25 serves to prevent any relative longitudinal movement between the frame 10 and the tractor body, the link connection of the springs 18 with the frame avoiding the necessity for any relative movement to allow full freedom of spring action.

Lateral weaving of the frame 10 and its body relative to the tractor, is prevented in this instance by radius links 27 hinged at their inner ends to a bracket 28 bolted on the tractor body and hinged at their outer ends to brackets 29 bolted to the webs of the frame members 11 and 12 respectively. This link connection permits relative up and down movement between the frame 10 and the tractor while preventing lateral swaying or weaving which would otherwise be permitted by the springs 18 and their connections.

In swinging about their inner hinged points, the links 27 ordinarily cause some slight inward and outward i. e. (lateral) movement of the frame members 11 and 12; but the latter are sufficiently flexible to allow this movement without serious resistance. On the other hand, the flexibility of the channel members 11 and 12 is such as to serve as an additional means for cushioning or absorbing the load shocks.

The invention disclosed herein is closely related to the invention claimed in our pending application Serial No. 234,214 filed November 18, 1927, which contains claims generic to this application. Our pending application Serial No. 232,389 filed November 10, 1927, also bears a relationship to this application.

Obviously the invention is not limited to the details of the illustrative construction since these may be variously modified.

What is claimed is:—

In combination, a tractor driving axle structure, a load-supporting frame mounted on the tractor and having resilient side members extending longitudinally of the tractor between its body and wheels and constructed and arranged to support a load carrying body above said axle structure; leaf springs having means for supporting them by the axle structure and connected thereto below the respective side members; means pivotally connecting the ends of the springs to said side members so that the frame is resiliently supported; and transverse links pivotally connecting the respective side members to the tractor body to prevent lateral movement of the frame relative to the tractor, while permitting vertical movement of the frame to a limited extent; the resilience of the side members checking any considerable vertical movement of the frame.

In testimony, that we claim the foregoing as our own, we have hereto affixed our signatures.

ARTHUR S. HUGHES.
HOWARD F. GORSUCH.